United States Patent
Gudorf (10) Patent No.: US 8,650,314 B2
(45) Date of Patent: *Feb. 11, 2014

(54) METHOD AND SYSTEM FOR REMOTE ACCESS OF PERSONAL MUSIC

(75) Inventor: Gregory D. Gudorf, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/210,617

(22) Filed: Aug. 16, 2011

(65) Prior Publication Data

US 2011/0302184 A1     Dec. 8, 2011

Related U.S. Application Data

(63) Continuation of application No. 09/785,094, filed on Feb. 16, 2001, now Pat. No. 8,024,419.

(60) Provisional application No. 60/203,684, filed on May 12, 2000.

(51) Int. Cl.
*G06F 15/16* (2006.01)

(52) U.S. Cl.
USPC ............................ 709/229; 709/217; 709/223

(58) Field of Classification Search
USPC ......... 709/225–229; 726/1–36; 340/5.8–5.86; 380/1–36
See application file for complete search history.

(56) References Cited

U.S. PATENT DOCUMENTS

| | | | |
|---|---|---|---|
| 5,428,606 A | 6/1995 | Moskowitz | |
| 5,583,763 A | 12/1996 | Atcheson et al. | |
| 5,653,005 A | 8/1997 | Speller, Sr. et al. | |
| 5,751,672 A | 5/1998 | Yankowski | |
| 5,784,646 A * | 7/1998 | Sawada | 710/38 |
| 5,793,980 A | 8/1998 | Glasser et al. | |
| 5,841,424 A | 11/1998 | Kikinis | |
| 5,860,068 A | 1/1999 | Cook | |
| 5,864,868 A | 1/1999 | Contois | |
| 5,900,564 A | 5/1999 | Kurakake | |
| 5,930,768 A | 7/1999 | Hooban | |
| 5,931,901 A | 8/1999 | Wolfe et al. | |
| 5,959,944 A | 9/1999 | Dockes et al. | |
| 5,959,945 A | 9/1999 | Kleiman | |
| 5,969,283 A | 10/1999 | Looney et al. | |
| 5,983,267 A | 11/1999 | Shklar et al. | |
| 5,986,200 A | 11/1999 | Curtin | |
| 6,067,566 A | 5/2000 | Moline | |

(Continued)

OTHER PUBLICATIONS

Add Your CDs, www.my.mp3.com, (Copyright 1996-2000) (2 pages).

(Continued)

*Primary Examiner* — Phuoc Nguyen
*Assistant Examiner* — Davoud Zand
(74) *Attorney, Agent, or Firm* — John P. O'Banion (57) ABSTRACT

In one aspect of the invention, a method is provided for storing audio files. The method includes: (a) receiving electronic files at a central location from a first device, those electronic files representing audio signals; (b) associating the audio files with identification information; (c) storing the audio files at the central location on at least a portion of a storage media, that portion being uniquely associated with the identification information; (d) receiving the identification information from a second device; and (e) transmitting the audio files to the second device upon receipt of the identification information.

20 Claims, 7 Drawing Sheets

(56) References Cited

U.S. PATENT DOCUMENTS

| | | |
|---|---|---|
| 6,182,045 B1 | 1/2001 | Kredo et al. |
| 6,182,128 B1 | 1/2001 | Kelkar et al. |
| 6,199,082 B1 | 3/2001 | Ferrel et al. |
| 6,493,672 B2 | 12/2002 | D'Agosto, III et al. |
| 6,546,421 B1 | 4/2003 | Wynblatt et al. |
| 6,574,377 B1 | 6/2003 | Cahill et al. |
| 6,609,105 B2 | 8/2003 | Van Zoest et al. |
| 6,789,954 B2 | 9/2004 | Lampert et al. |
| 6,816,703 B1 | 11/2004 | Wood et al. |
| 2004/0128514 A1 | 7/2004 | Rhoads |
| 2005/0013462 A1 | 1/2005 | Rhoads |
| 2009/0228336 A1 | 9/2009 | Giordano et al. |

OTHER PUBLICATIONS

Never Lug Your CDs Around Town Again!, www.my.mp3.com, (Copyright date 1996-2000) (1 page).

RIAA Sues Music Startup Napster for $20 Billion, www.mp3newswire.net/stores/napster.html (dated Dec. 9, 1999) (2 pages).

RIAA vs. MP3.com, http://www.mp3.com/news/533.html, (dated Jan. 21, 2000) (7 pages).

* cited by examiner

| DeviceID | User Files | Copies Left: |
|---|---|---|
| Device1 | "File1" (SongA) | 5 |
| Device2 | "File4" (SongA) | 3 |
| Device3 | "File5" (SongD) | unlimited |

FIG. 7

| UserID | User Files | | | Device Identifiers | | | |
|---|---|---|---|---|---|---|---|
| User1 | "File1" (SongA) | "File2" (SongB) | "File3" (SongC) | Device1 (Walkman brand player) | Device2 (Car) | Device3 (PC) | Device4 (Clie brand PDA) |
| User2 | "File4" (SongA) | | | Device5 (Walkman brand player) | | | |
| User3 | "File5" (SongD) | "File6" (SongE) | "File7" (SongA) | Device6 (Walkman brand player) | Device7 (PDA) | | |

METHOD AND SYSTEM FOR REMOTE ACCESS OF PERSONAL MUSIC

CROSS-REFERENCE TO RELATED APPLICATIONS

This application is a continuation of U.S. application Ser. No. 09/785,094, filed on Feb. 16, 2001, which claims the benefit of U.S. Provisional Application No. 60/203,684, filed on May 12, 2000, which is hereby incorporated by reference.

BACKGROUND OF THE INVENTION

Many consumers today have amassed substantial music collections in the CD audio format. The physical aspect of such a large collection however means that a consumer wishing to enjoy their collection from any place other than where the collection is located must make a choice as to which CD to take with them as they move about.

The primary alternative to date has been for the consumer to record select CD's onto cassette tape or mini-disc mediums to take with them when they leave the vicinity of their music collection. By default, this means the entire collection is not remotely available for the consumer's enjoyment.

As a newer alternative, the advent of the MPEG-based MP3 file format has enabled consumers to record (rip) their CD's and store them as MP3 files on their personal computers. This does enable a degree of added flexibility, however as the number of files is limited by the available hard disk drive space in the consumer's PC, it is also an inadequate solution. Since a typical album requires approximately 30-60 mb of hard disk space, the storage requirement of this and similar file formats once again forces the consumer to choose which elements of their music collection they want to enjoy instead of having access to the entire collection.

There is thus a need for a system which allows users both mass storage and portability.

BRIEF SUMMARY OF TEE INVENTION

The present invention meets those needs.

In one aspect of the invention, a method is provided for storing audio files. The method includes (a) receiving electronic files at a central location from a first device, those electronic files representing audio signals; (b) associating the audio files with identification information; (c) storing the audio files at the central location on at least a portion of a storage media, that portion being uniquely associated with the identification information; (d) receiving the identification information from a second device; and (e) transmitting the audio files to the second device upon receipt of the identification information.

In another aspect of the invention, a system is provided for storing and transmitting audio information. It includes a processor, memory, data stored in the memory and instructions executable by the processor. The data identifies a plurality of users or devices and also includes a plurality of files associated with audio information. Each of the files is uniquely associated with the identity of a single user or device. The set of instructions also conditions the transmission of a song from the system to a user or device based on the identity of the user or device associated with the audio information.

In yet another aspect, a method of storing and transmitting songs includes: uniquely associating a portion of the storage space on a server with a user or device; associating the portion with a first identifier; receiving the first identifier; receiving a song file representative of a song; storing the song file in the portion of the storage space associated with the first identifier; receiving a second identifier and a request for the song file; comparing the second identifier with the identifier associated with the requested song file; and transmitting the song file in response to the request depending upon the outcome of the step of comparing.

DETAILED DESCRIPTION

Figure 1:
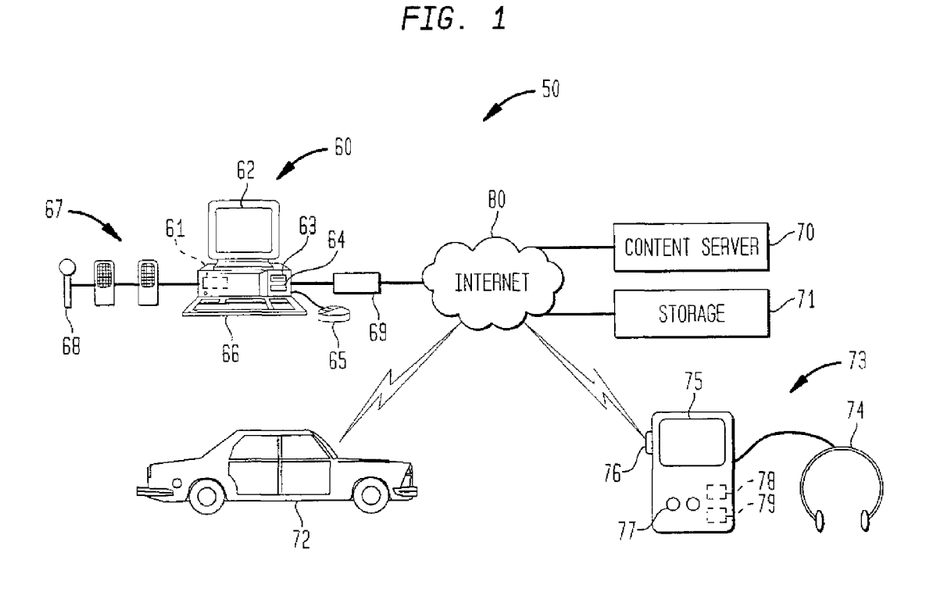
FIG. 1 is a functional diagram of a system in accordance with an embodiment of the invention.

As shown in FIG. 1, a system 50 in accordance with one embodiment of the invention comprises a network of devices such as end user personal computer 60, web servers 70-71, PDA and car-audio system 72, all of which communicate via Internet 80. Although only a few devices are depicted in FIG. 1, it should be appreciated that a typical system can include a large number of connected devices. Preferably, end user computer 60 is a general purpose computer having all the internal components normally found in a personal computer such as, for example, central processing unit (CPU) 61, display 62, CD-ROM 63, hard-drive 64, mouse 65, keyboard 66, speakers 67, microphone 68, modem 69 and all of the components used for connecting these elements to one another. End user computer 60 communicates with the Internet 80 via modem 69. End user computer 60 may comprise any workstation capable of processing instructions and transmitting data to and from humans and other computers, including network computers lacking local storage capability.

Also connected to network 80 is a personal digital assistant (PDA) with wireless capability having all the internal components normally found in a PDA such as, for example, a processor 78, touch-sensitive display 75, buttons 77, modem 76 and all of the components used for connecting these elements to one another. The buttons 77 and touch-sensitive display 75 are typically used for data entry. The PDA also includes a headphone jack for use with headphones 74. The processor executes instructions stored on a storage medium, such as RAM 79. Although a PDA is shown by way of example in this embodiment of the present invention, it should be understood that the PDA may also comprise other mobile devices, such as Internet-capable wireless phones.

Car audio system 72 also communicates with Internet via a wireless communication. The car audio system includes a receiver (not shown) for receiving electronic information over the Internet and a speaker (not shown) for playing the audio signals contained in the audio information.

Web server 70 contains hardware for sending and receiving information over the World Wide Web, such as web pages or files. The web server 70 may be a typical web server or any computer network server or other automated system capable of communicating with other computers over a network, including the Internet, wide area networks or local area networks. For example, the system described above in connection with end user computer 60 may also function as a web server.

Moreover, the system is not limited to the World Wide Web or the Internet but, rather, is applicable to any network allowing remote communication to a central storage area by multiple devices.

Figure 2:
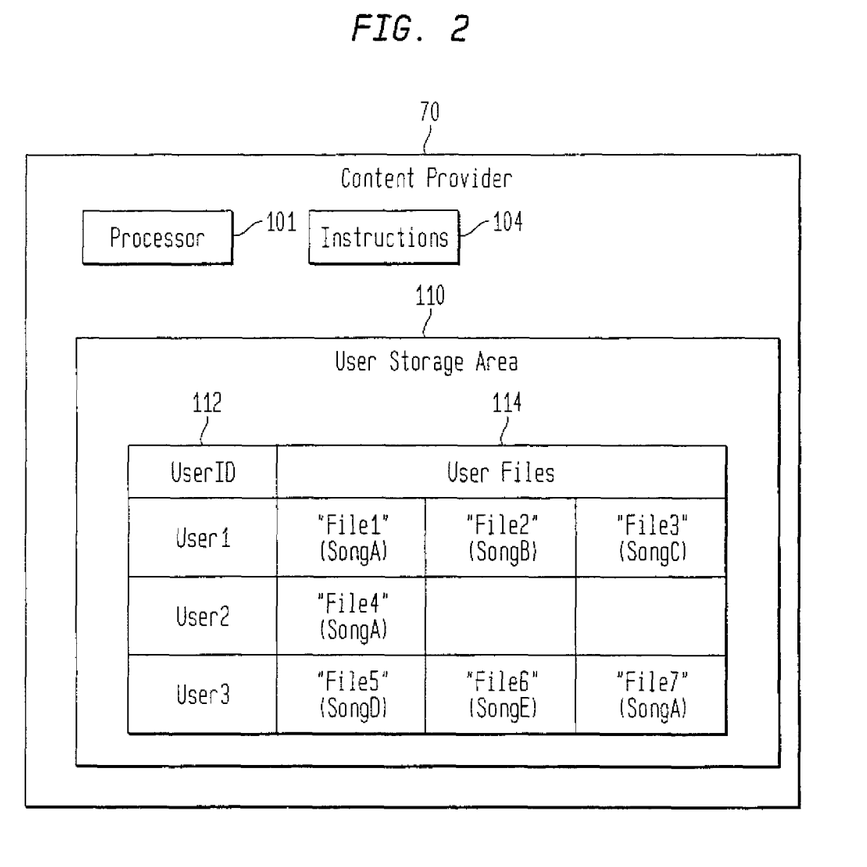
FIG. 2 is a functional diagram of a content provider in accordance with an embodiment of the invention.

As shown in greater detail in FIG. 2, web server 70 functions as a content store and contains a processor 102, a set of instructions 104 which are executed by processor 102 and data such as user storage area 110. The functions, methods and routines of the program are explained in more detail below. Although the data is shown separately from the instructions, the data may be modified by the processor during execution of the instructions. Moreover, both the data and the instructions may be stored as a program on the hard disk of the server 70.

User storage area 110 is used to store the user music files 114 uploaded by the users. Preferably, each user has a predefined amount of space allocated to its sole use, and no other user is permitted unauthorized access to any information stored in its particular space. Each user has a User ID 112 which identifies the space allocated to the user. For illustration purposes, three different user spaces are schematically shown in FIG. 2 for users with ID's "User1", "User2" and "User3". User1 has three music files stored in its space, including files called "File1", "File2" and "File3" corresponding with songs named "SongA", "SongB" and "SongC", respectively. User2 also has a file stored in its space designated as "File4". However, as indicated by the "SongA" label in parenthesis next to "File4", that file may be the same song as—and byte for byte a copy of—"SongA" contained in File1 of User1. File1 and File4 may also be quite different even if the song is the same, such as if the same song was encoded at two different frequencies. FIG. 2 also shows User3 as having three music files, "File5", "File6" and "File7" corresponding with "SongD", "SongE" and "SongA" (again), respectively.

Figure 3:
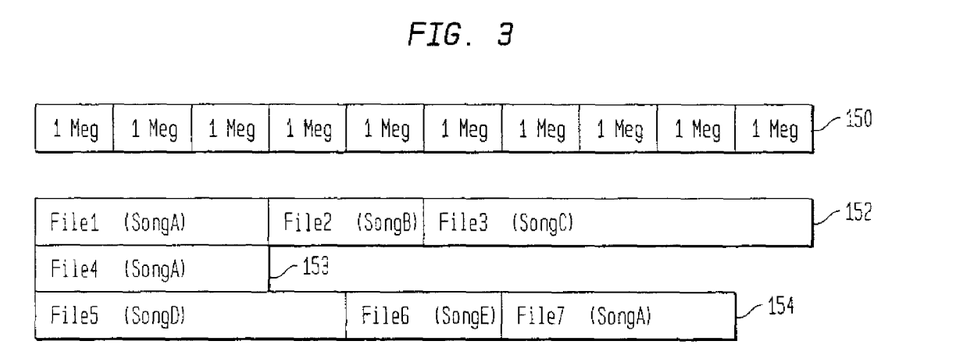
FIG. 3 is an example of memory allocation in accordance with an embodiment of the invention.

The manner in which songs are stored and occupy user storage area 100 is also shown schematically and to scale in FIG. 3. In the diagram, the width of a cell relates to the size of the associated file. The width of each cell in row 150 relates to 1 MB of data. As can be seen, assuming that each user has stored the exact same copy of the SongA music file, the music file will take up the same amount of space in each individual user's space 152-54. If desirable, the system may limit each user to a particular amount of storage space, such as 100 megabytes of music.

Figure 4A:
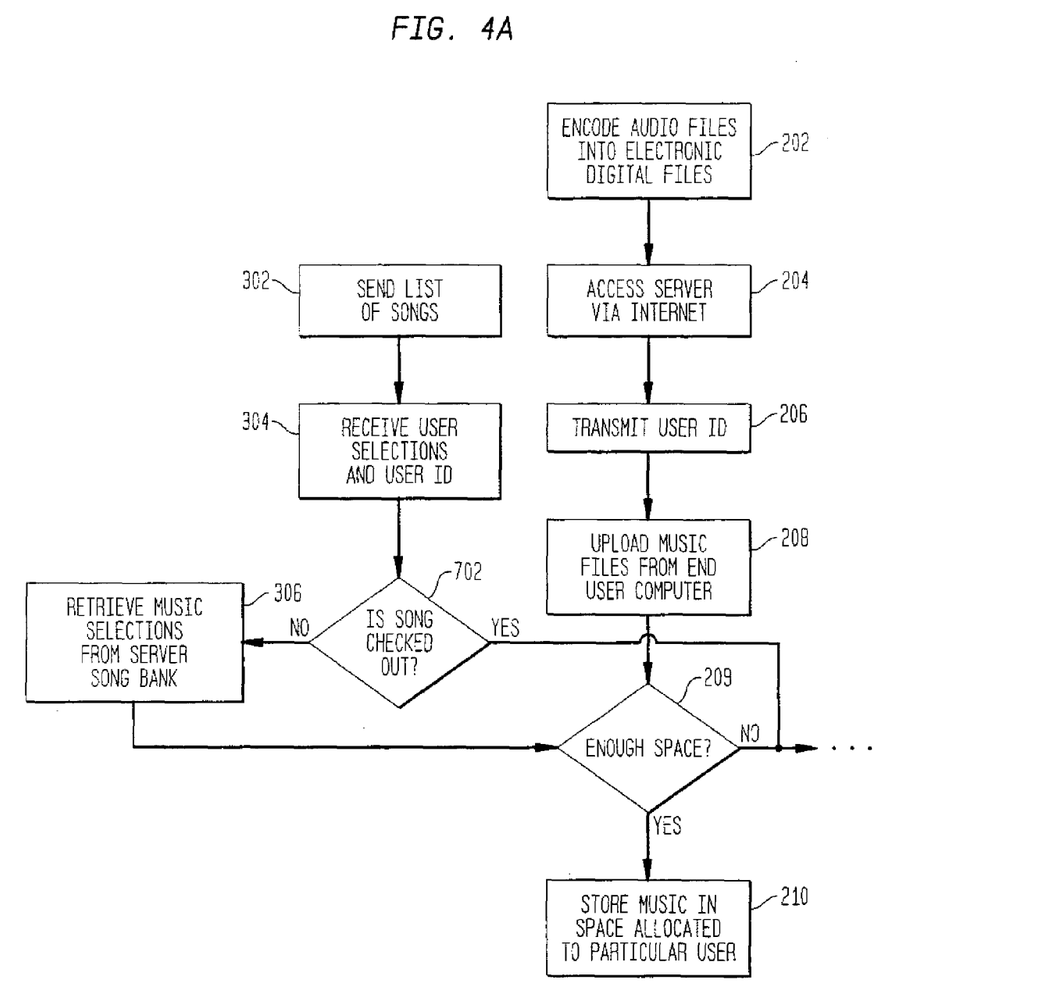
FIGS. 4A and 4B show a flow chart of operations in accordance with an embodiment of the invention.
Figure 4B:
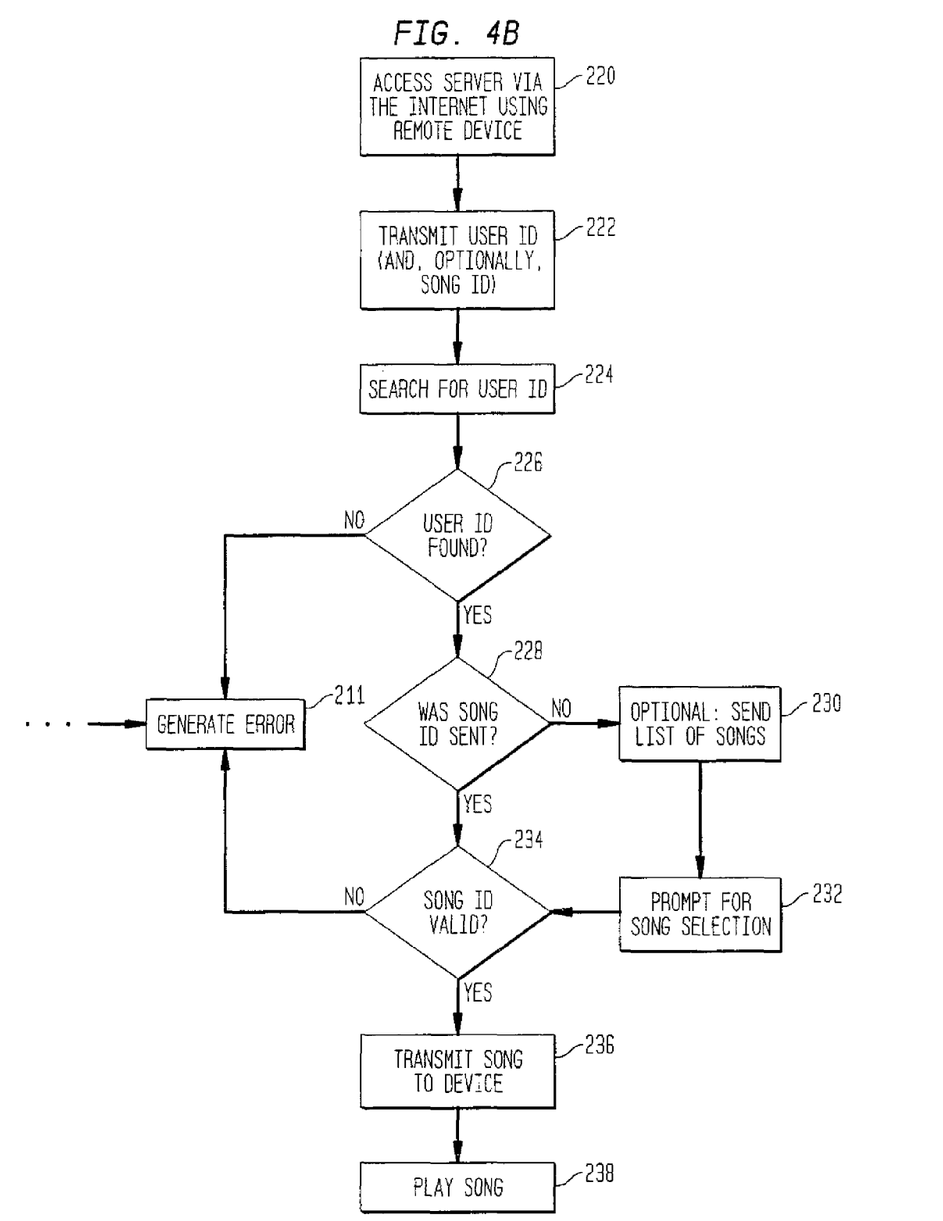

In operation in accordance with one embodiment, music is stored on the server in accordance with the steps shown in the flowchart of FIG. 4. First, the user encodes audio compact discs from red book format or an analog source into electronic digital files (step 202). The files are preferably compatible with MPEG-3 format or Sony's ATRAC3 format and are encoded with a general purpose computer, such as computer 60, or a dedicated device. The user then causes end user computer 60 to access the content server 70 via the Internet 80 (such as by logging onto a web page) (step 204), supplies its User ID 112 (step 206) and then uploads the files to the content server 70 (step 208). Using the foregoing example of FIG. 2, User1 would take a compact disc it owned, encode "SongA" as a digital file on end user computer 60 and upload the digital file to the content server 70 via Internet 80. In so doing, the user identifies the song with a string, such as "File1".

Upon receipt of the User ID 112 and the song file, processor 101 of server 70 in accordance with instructions 104 first checks the size of the file to make sure that the user has not exceeded its space limit (step 209). If the user has, then an error notification will be sent to the user explaining the problem (step 211). Otherwise, processor 101 will store the uploaded file into the space allocated for the particular user (step 210), and associate the file with the identifying string provided by the user.

The operation of downloading the music is also shown in FIG. 4. In this embodiment, the user accesses the content server 70 (such as by logging onto a web page) via PDA which, for the purposes of this example, shall be considered to be at a geographic location remote from end user computer 60 (step 220). In other words, although the user uploaded the songs with one device, the user may download the songs at a different location with a different device. The user accesses the web site maintained by content server 70 by using wireless modem 76 in a manner well known to those of ordinary skill in the art. The user next supplies its User ID to content server 70 by entering the information on a web page displayed on screen 75 (step 222). For example, the user may identify itself as "User1" (it is recommended, but not required, that user names be more arbitrary than a designation of "User1" for security reasons). Optionally, the song may be identified at the same time as well. Processor 101 of server 70 searches user storage area 110 to see whether there is any user associated with that particular ID (steps 224 and 226). If the user ID is not found, an error notification is sent to the user to that effect (step 211).

If the user ID is found, the server 70 checks whether it has already been provided with an identification of the song to be downloaded (step 228). If not, then server 70 may, optionally, send a list of the identifying strings to the user (step 230). For example, server 70 would send the strings "File1", "File2" and "File3" if the songs matched the illustrative examples in FIG. 2. These strings could be displayed on screen 75. Content server 70 next prompts the user to enter the identifier for the song, which may be entered via touch-screen 75 (step 232).

The identifier for the song is checked against the list of songs associated with that user (step 234). Using the example values of FIG. 2, the string "File1" would be valid identifier because there is a song file having that identifier contained in User1's space. The string "File4", on the other hand, would not be a valid identifier even though it points to a byte-for-byte identical file with the same name in User2's space. Accordingly, the identifier must identify a song contained in the respective user's space. If the song with that identifier is not contained in the space allocated to that user in user storage user 110, the user is notified of the error (step 211).

If the song is validly identified, the song is then sent from the server 70 to the PDA 73 (step 236). Once downloaded, the song may then be played by the user (step 240).

Accordingly, each user is assigned a unique identification code such that the user (or the entity to whom the user gives the code) is the only entity that can upload and download music to and from the storage space allocated to the user. This identification code is sent with, or before, the steps of uploading and downloading and is used to verify that the requester is the user associated with the particular storage space. It is not necessary for the server to set aside, in advance, actual portions of the storage space to particular users. Rather, the files may be first stored (and thus occupy a portion of the hard drive of the server) and access permissions set for the file set in accordance with the identify of the user.

After the music is uploaded by the user to the central location, it may be played anywhere by any device capable of connecting with the server. For example, if the online service provider hosts a website, the user provides its unique identification code and the online service provider authenticates the user. The user may then download, via the internet, a copy of one or more of the music files that had been uploaded by the user.

Rather than downloading the music, the music may also be streamed to the user. Security choices may dictate whether the music file is served via a streaming process or a download, as streaming places more of a requirement on the connection but downloads place more of a resource requirement on the device. For the purposes of this disclosure, the word "download" should be understood to include real-time streaming regardless of whether the transmitted information may be permanently and locally stored.

One of the advantages of the system is that there is a copy of a song for every user, rather than giving one copy of a song to multiple users. Moreover, the user is responsible for maintaining the songs stored in their space. Thus, the invention facilitates respect for copyright owner's rights to prevent multiple unauthorized parties from downloading the same song.

Figure 7:
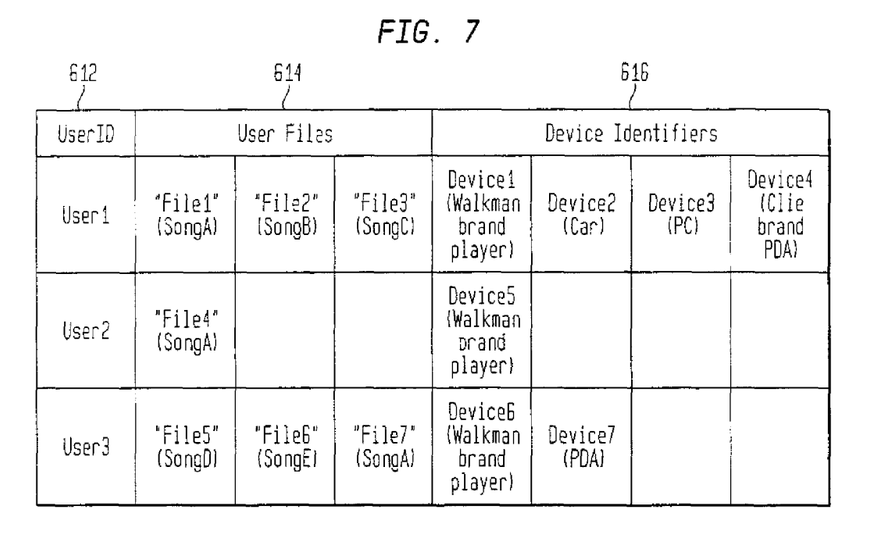
FIG. 7 is a functional diagram of a user storage area in accordance with an embodiment of the invention.

Preferably, the system provides music to dedicated devices by automatically authenticating the devices upon connection. In such an embodiment, each device that accesses songs stored in content server 70 has an identifier which is unique to the system. For example, such an identifier may be a GUID. The unique identifier may also be a number stored in the RAM or other readable/writable storage media of the device, such as RAM 79 of PDA 73. This information may be stored in the user storage area of content server 70 as shown in FIG. 7. For each User ID 612 in the user storage area, there are not only songs 614 but also a list of device identifiers 616. For example, the identifier "Device1" may be the value of the device identifier stored in a network-enabled Walkman® player operated by User1, "Device2" may be the value of the device identifier stored in the car audio system 72 operated by the same User1, "Device3" may be the value of the device identifier stored in end user computer 60 operated by User1, and "Device4" may be the value of the device identifier stored in a Clie™ PDA operated by User1.

In one possible operation of such a system, the device connects with the content server via the Internet (FIG. 4; step 250). The device automatically transmits its unique identifier (step 252). In response, the processor of the content server searches the device identifiers 616 to determine the associated user ID (step 254). If a user ID is found, then the process proceeds as described above.

Figure 6:
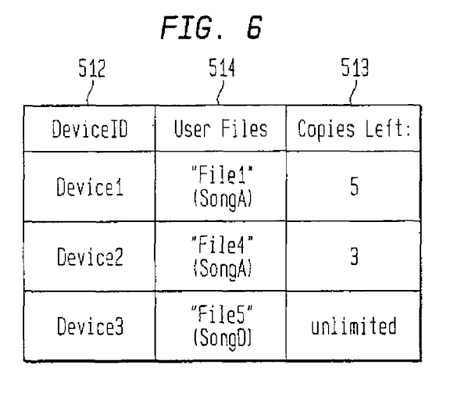
FIG. 6 is a functional diagram of device information data stored in a content server in accordance with an embodiment of the invention.

Preferably, the system also has the ability to limit the number of songs that a consumer can download or stream to, either simultaneously or in total. In such an embodiment and as shown in FIG. 6, each content server 70 counts how many times a file has been downloaded. The processor also decrements that value each time it is downloaded. For example, if a device designated as "Device1" was given a trial period to listen to Song A, then content server 70 may store the value "5" in the Copies Left field 513 of the user storage area, thus indicating that the device may download the song 5 times. Each time the song is downloaded, the value decrements. For example, FIG. 6 shows that "Device2" may only download the song 3 more times. However, if SongA were purchased, then the device would be able to download the song any number of times (such as is shown for "Device3").

Limiting the authorization to a particular device or user has its own unique advantages. If the authorization is limited to a particular user ID, which is not wedded to a particular device, then a user may grant access to friends and associates by passing along his or her ID. On the other hand, if a more secure environment is required, then the device ID may be hardwired into the unit, such as GUID. Preferably, the content server 70 will allow both possibilities. Thus, certain songs, such as sound clips, may be freely transferable provided you have a particular user ID. Different songs, on the other hand, would be limited to a specific number of plays on a particular device. Access can thus be limited to particular devices or could provide the user with full "owner" access.

Figure 5:
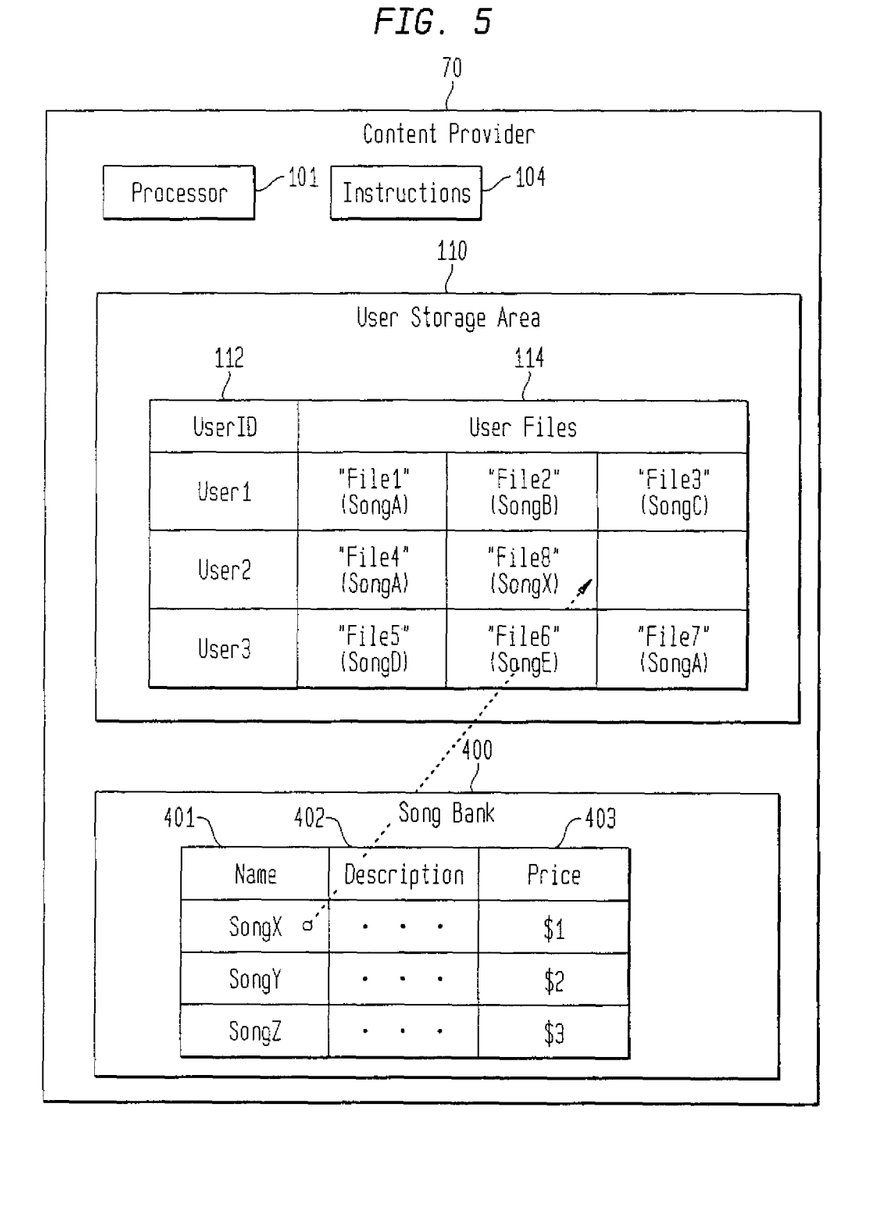
FIG. 5 is a functional diagram of another content provider in accordance with an embodiment of the invention.

In another embodiment, the user does not encode and upload the song themselves. Rather, the user buys a copy of the music from the content server 70 and the file is stored in the user's space. Specifically, as shown in FIG. 5, content server 70 includes a database of music selection. This database, song bank 400, stores a plurality of songs as music files. The songs are designated by name 401, a description 402 and the price of the song 403.

In the operation of this embodiment, the user will access the content server and obtain a list of music selections which are available for use (step 302 of FIG. 4). For example, a list of the songs, their descriptions and prices may be sent as a web page to end user computer 60. The user selects the songs that they would like and then transmits that information, along with their User ID, to the content server 70 (step 304). For example, "User 2" may indicate that they wish to listen to "Song X". Upon receiving the name of the song from the user, processor 101 then extracts the file associated with the song from the song bank 400 (step 306). The process then proceeds as if the song had been uploaded by the user, i.e. the processor 101 checks the size of the selected song against the space remaining available to the user (step 209). If there is enough room, the song is stored in the area allocated to the particular user (step 210) as schematically indicated by the dashed arrow in FIG. 5. Accordingly, in this embodiment, even when a copy of the song is available on the server, yet another copy of the song will be stored in the user's space in user storage area 110. The database may also be contained at a separate site or server, such as server 71 of FIG. 1.

The embodiment shown in FIG. 2 permits other interesting options and variations. For example, the system may deploy a security system such as those currently being contemplated by the music industry for online use such as SDMI. The user may be able to "check" particular songs in and out of song bank 400. If one user has loaded the song onto its system, then no other user would be permitted to listen to the song, thus preventing multiple parties from simultaneously playing or using the same song. Such an embodiment may be implemented as shown by step 702 of FIG. 4, whereby a song may only be uploaded into a user's space if it is not checked out to someone else. The song could be checked back in in any number of different ways, such as the user simply informing the content server that it has finished listening to the song or counting the number of streaming downloads (as discussed in connection with FIG. 6) and checking it back in when the Copies Left field 513 reaches zero. In other words, the system is geared to prevent unauthorized multiple copies of a single authorized copy. This helps prevent piracy and the inappropriate use of the music collection stored on the network.

Another one of the myriad advantages of the present invention is that users are able to access music from any location without having to carry media containing the music. A user may place a copy of its music at a central location and play that music from any remote location. Another advantage is that the authentication mechanism protects third party's rights in the user's music but still preserves the foregoing advantage of portability. Moreover, by providing a unique storage area at a central location, the user can access the music regardless of whether or not the device used to encode or upload the music is powered on or not. In other words, the consumer may upload their entire music collection to a system server operated as an independent service and will then be able to access the entire collection from anywhere in the world, from any device connected to the Internet and equipped with audio-enabled and browser technology. The rapidly advancing availability of wired and wireless Internet connectivity means a music-loving consumer can readily access their entire collection from any place they can connect.

Another advantage of the invention is that it can accommodate security requirements. For example, the central server may also check music for security limitations before permitting the music file to be stored.

Additionally, because the user is able to upload the music they want, the user can create unique compilations in accordance with the user's personal preferences. The user can thus create compilations directed to particular genres of music (such as dance or exercise). Optionally, the user may also change the order that the songs are downloaded or streamed.

In another implementation, the first time the consumer plays a new CD they are adding to their collection, their Internet connected CD player or changer would upload the file to the network server for storage. This upload process could be implemented in variety of ways including the disc-by-disc upload from the CD-ROM drive of a PC connected to the Internet or from a new service-based business designed to transfer the consumer's collection in total. The file format used could be any of the known or to be developed formats given file size, sound quality, and security trade-offs.

In addition, because the network is functioning as the storage facility for the consumer's audio collection, the network could employ preference mining techniques as to the collection's content and frequency of use as well as device context. Such data mining would enable the network to actually recommend selections from the collection to match particular activities or to suggest new music which might be enjoyed by the same consumer.

Unless stated to the contrary, use of the words such as "including," "containing," "comprising" and the like, means "including without limitation" and shall not be construed to limit any general statement that it follows to the specific or similar items or matters immediately following it.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method for storing audio files, comprising:
   receiving at a central location one or more electronic files from a first device, the electronic files representing one or more compressed audio files;
   associating the electronic files with authentication identification information of a user;
   searching a collection of audio files for the one or more compressed audio files represented by the one or more electronic files;
   storing one or more of the one or more compressed audio files at the central location on at least a portion of a storage media, the portion uniquely associated with the authentication identification information;
   receiving at the central location the authentication identification information from a second device;
   transmitting one or more of the compressed audio files to the second device upon receipt of the authentication identification information; and
   playing the one or more of the compressed audio files.

2. The method of claim 1 wherein the one or more electronic files represent one or more songs.

3. The method of claim 1 wherein at least one of the devices is a general purpose computer.

4. The method of claim 1 wherein at least one of the devices is a mobile phone.

5. The method of claim 1 wherein at least one of the devices is a portable music player.

6. The method of claim 1 wherein the step of transmitting comprises uploading the one or more compressed audio files to the second device for playback.

7. The method of claim 1 wherein the step of transmitting comprises streaming the one or more compressed audio files to the second device for playback.

8. The method of claim 1 wherein the second device is associated with the authentication identification information.

9. The method of claim 1 wherein the step of transmitting comprises transmitting to the second device and a third device simultaneously.

10. The method of claim 9 wherein the third device is the same as the first device.

11. The method of claim 1 wherein the step of transmitting comprises transmitting simultaneously to at most one device.

12. A method for storing audio files, comprising:
    receiving at a central location authentication identification information of a user from a first device;
    transmitting from the central location a first electronic file, the first electronic file representing a listing of one or more compressed audio files associated with the authentication identification information;
    receiving at the central location a second electronic file from the first device, the second electronic file representing a subset of the listing of audio files;
    associating the second electronic file with the authentication identification information of the user;
    receiving at the central location the authentication identification information from a second device;
    transmitting one or more of the compressed audio files to the second device upon receipt of the authentication identification information; and
    playing the one or more of the compressed audio files.

13. The method of claim 12 further comprising:
    receiving a third electronic file from the first device, the third electronic file representing a subset of the compressed audio files represented by the first electronic file; and
    associating the third electronic file with the authentication identification information of the user.

14. The method of claim 12 wherein the subset of compressed audio files represented by the second electronic file is a permutation of the first electronic file.

15. The method of claim 12 wherein the listing of one or more compressed audio files represents a compilation of songs.

16. A method for storing audio files, comprising:
    receiving at a central location authentication identification information of a user from a first device;
    transmitting from the central location a first electronic file associated with the authentication identification information, the first electronic file representing a listing of one or more compressed audio files;

receiving at the central location a second electronic file from the first device, the second electronic file representing a subset of the listing of compressed audio files;

storing one or more of the compressed audio files represented in the subset at the central location on at least a portion of a storage media, the portion uniquely associated with the authentication identification information;

receiving at the central location the authentication identification information from a second device;

transmitting one or more of the compressed audio files to the second device upon receipt of the authentication identification information; and playing the one or more of the compressed audio files.

17. The method of claim 16 wherein the listing of compressed audio files represented by the first electronic file includes a listing of song recommendations.

18. The method of claim 16 wherein the listing of song recommendations is based on information associated with a set of audio files associated with the authentication identification information.

19. The method of claim 18 wherein the information associated with the set of audio files is one or more of artist, album, or genre.

20. The method of claim 18 wherein the listing of song recommendations is based on the frequency of use of the audio files in the set of audio files associated with the authentication identification information.

* * * * *